United States Patent
Ohsugi

(10) Patent No.: US 7,800,804 B2
(45) Date of Patent: Sep. 21, 2010

(54) OPTICAL SCANNER AND IMAGE FORMING APPARATUS

(75) Inventor: Tomoya Ohsugi, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 797 days.

(21) Appl. No.: 11/715,317

(22) Filed: Mar. 8, 2007

(65) Prior Publication Data

US 2007/0216966 A1 Sep. 20, 2007

(30) Foreign Application Priority Data

Mar. 9, 2006 (JP) ............................. 2006-064153

(51) Int. Cl.
*G02B 26/08* (2006.01)

(52) U.S. Cl. ............... 359/196.1; 359/198.1; 359/212.1

(58) Field of Classification Search .... 359/196.1–226.2
See application file for complete search history.

(56) References Cited

U.S. PATENT DOCUMENTS 4,796,963 A * 1/1989 Yoshimura ............... 359/218.1

2003/0133175 A1* 7/2003 Suzuki et al. ............... 359/204
2005/0270612 A1* 12/2005 Akiyama ..................... 359/206

FOREIGN PATENT DOCUMENTS

| JP | 09-105881 | 4/1997 |
|----|-----------|--------|
| JP | 2005-092119 | 4/2005 |

* cited by examiner

*Primary Examiner*—James Phan
(74) *Attorney, Agent, or Firm*—Harness, Dickey & Pierce, P.L.C.

(57) ABSTRACT

A disclosed optical scanner includes a light source, a deflector that deflects a light beam emitted by the light source, a scanning imaging element that images and scans the deflected light beam as a light spot on an imaging surface, and an optical box that contains at least the deflector and the scanning imaging element and that is substantially sealed from outside. The deflector is substantially sealed so as to be substantially insulated from the scanning imaging element in the optical box. Among outer walls of the optical box insulating a space inside the optical box from the outside, at least an outer wall positioned above the deflector includes an upside-down U-shaped cross-sectional shape portion.

7 Claims, 8 Drawing Sheets

OPTICAL SCANNER AND IMAGE FORMING APPARATUS

BACKGROUND OF THE INVENTION

1. Field of the Invention

The present invention relates to an optical scanner with a heat transfer function and an image forming apparatus including the same, such as a digital copier or a laser printer.

2. Description of the Related Art

Image forming apparatuses are increasingly capable of producing images with higher speed and higher density. Accordingly, image forming apparatuses are equipped with optical scanners including polygon scanners that rotate at a rotational speed of 30,000 rpm-50,000 rpm.

When polygon scanners rotate at high speed, heat is generated due to friction of a rotation driving unit. Furthermore, the current increases in the circuit, which causes even more heat. As a result, the temperature near the polygon scanner rises. Moreover, a hissing sound caused by the rotation of a polygon mirror becomes louder.

Optical boxes are often made by molding a low-cost resin material. However, because thermal conductivity of resin is low, it is difficult for heat to be released outside from such an optical box made of resin, when the temperature rises near the polygon scanner. This shortens the service life of the polygon scanner and/or deforms the optical box and/or an imaging element, thus degrading optical properties.

One approach is disclosed in Patent Document 1. Specifically, a deflector (rotating mirror) is covered by an aluminum die-cast cap in such a manner that part of the cap is exposed to the atmosphere outside an optical scanner. However, such a metal cap is extremely expensive. Furthermore, the deflector is usually arranged in the center of the optical scanner in a main scanning direction. Therefore, it is difficult to lay out a flow passage such that airflow for cooling the exposed part of the cap is guided toward the cap and the warmed air colliding against the cap is released outside.

In one example of an optical scanner, plural light fluxes from different directions are incident on one deflector and are deflected by the deflector. The light fluxes then pass through plural imaging elements arranged substantially symmetrically with respect to the deflector to scan plural surfaces (imaging surfaces). In such an optical scanner, the deflector is arranged in the center of a large area of the optical scanner. Therefore, it is extremely difficult to secure a sufficient amount of space for installing a duct and a fan for guiding airflow toward the deflector. Accordingly, even if extra funds are spent and a large space is reserved for providing radiating fins near the deflector, a sufficient cooling effect cannot be achieved. Furthermore, in an effort to reduce the size of the image forming apparatus, components are increasingly being arranged close to each other, which is disadvantageous in terms of the layout for heat radiation. Moreover, the usage of a cooling fan increases power consumption and generates noise, which have a great impact on the environment.

Meanwhile, in a method disclosed in Patent Document 2, the space around the deflector is not enclosed, so that the air in the entire space inside an optical scanner can be mixed with airflows generated by the rotation of a deflector. Therefore, the temperature of the deflector does not rise. However, in this method, the warmed air near the deflector is directly blown onto a scanning imaging element, and the temperature inside the entire optical scanner changes rapidly. As a result, the scanning imaging element may be deformed due to changes in the temperature, and optical properties are considerably degraded due to changes in the positions and/or tilt angles of the optical elements. Furthermore, the hissing sound caused by the rotation of the deflector is not sufficiently reduced, and the noise can be heard outside the optical scanner.

Patent Document 1: Japanese Laid-Open Patent Application No. H9-105881

Patent Document 2: Japanese Laid-Open Patent Application No. 2005-92119

SUMMARY OF THE INVENTION

The present invention provides an optical scanner and an image forming apparatus including the same in which one or more of the above-described disadvantages are eliminated.

A preferred embodiment of the present invention provides an optical scanner in which the inside of the optical scanner can be cooled at low cost and a hissing sound caused by the rotation of a deflector can be sufficiently reduced.

An embodiment of the present invention provides an optical scanner including a light source configured to emit a light beam; a deflector configured to deflect the light beam emitted by the light source; a scanning imaging element configured to image and scan the light beam deflected by the deflector as a light spot on an imaging surface; and an optical box configured to contain at least the deflector and the scanning imaging element, the optical box being substantially sealed from outside; wherein the deflector is substantially sealed so as to be substantially insulated from the scanning imaging element in the optical box, and among outer walls of the optical box insulating a space inside the optical box from the outside, at least an outer wall positioned above the deflector includes an upside-down U-shaped cross-sectional shape portion.

An embodiment of the present invention provides an optical scanner including a light source configured to emit a light beam; a deflector configured to deflect the light beam emitted by the light source; a scanning imaging element configured to image and scan the light beam deflected by the deflector as a light spot on an imaging surface; and an optical box configured to contain at least the deflector and the scanning imaging element, the optical box being substantially sealed from outside; wherein the deflector is substantially sealed so as to be substantially insulated from the scanning imaging element in the optical box, and among outer walls of the optical box insulating a space inside the optical box from the outside, at least an outer wall positioned above the deflector is made of a material that has higher heat conductivity than the other outer walls.

An embodiment of the present invention provides an optical scanner including a light source configured to emit a light beam; a deflector configured to deflect the light beam emitted by the light source; one or more scanning imaging elements configured to image and scan the light beam deflected by the deflector as a light spot on an imaging surface; and an optical box configured to contain at least the deflector and the one or more scanning imaging elements; wherein the deflector is substantially sealed so as to be substantially insulated from the one or more scanning imaging elements in the optical box, and among the one or more scanning imaging elements, at least a scanning imaging element arranged near the deflector is made of a resin material and a bottom side thereof is spaced apart from the optical box with a gap therebetween.

According to one embodiment of the present invention, a deflector is substantially sealed to be insulated from scanning imaging elements, so that the inside of an optical scanner can be cooled at low cost by taking advantage of natural convection generated within the optical scanner, and hissing sounds generated by the deflector can be sufficiently reduced.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given, with reference to the accompanying drawings, of an embodiment of the present invention.

Figure 1:
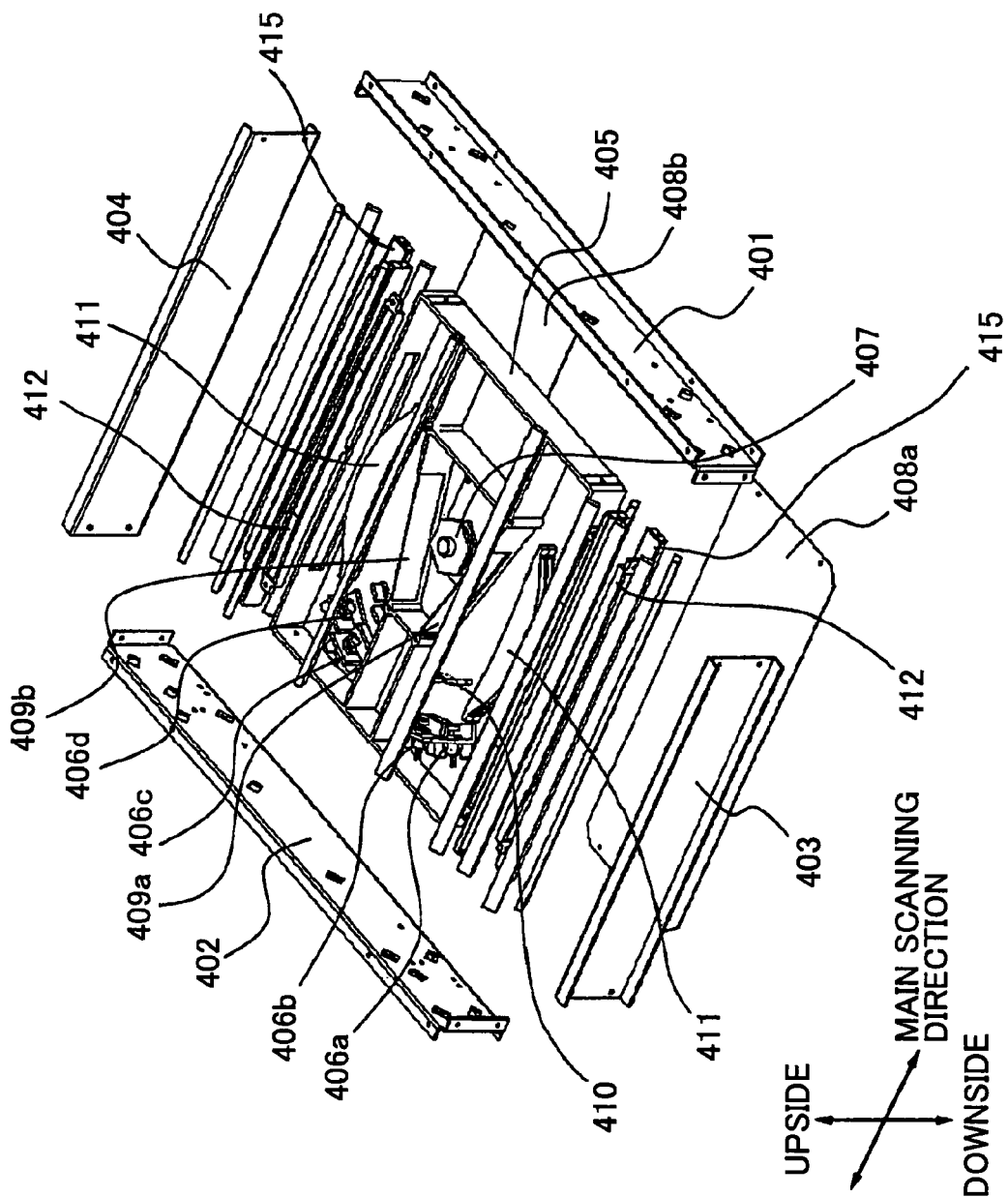
FIG. 1 is a perspective view of an optical scanner according to a first embodiment of the present invention.
Figure 2:
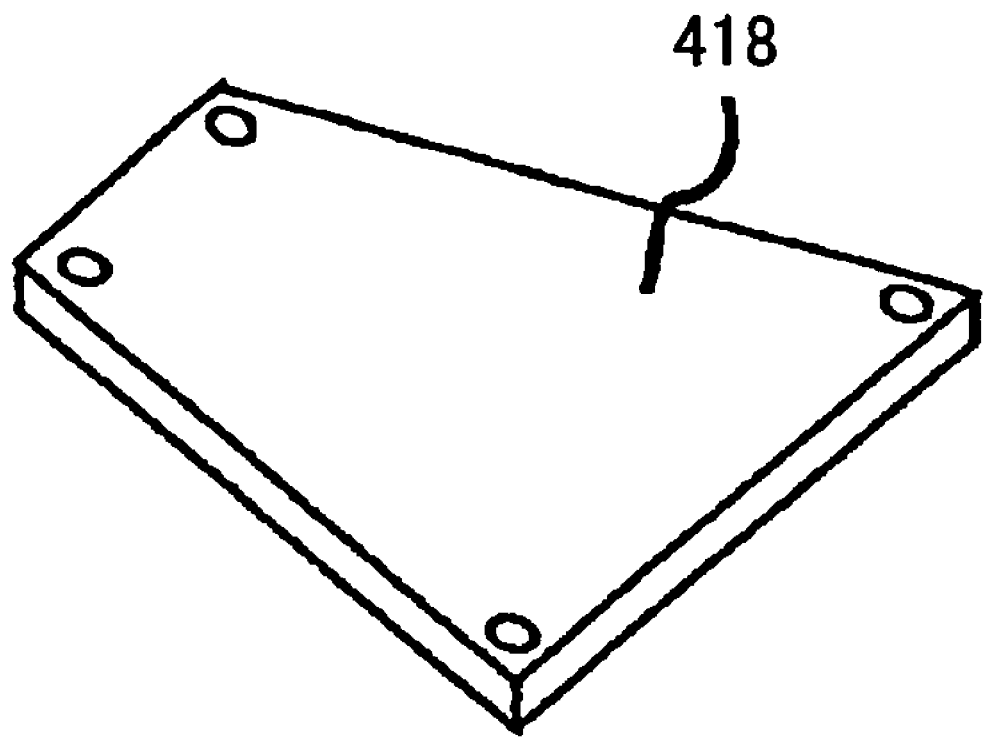
FIG. 2 is a diagram of a deflector cover.
Figure 3:
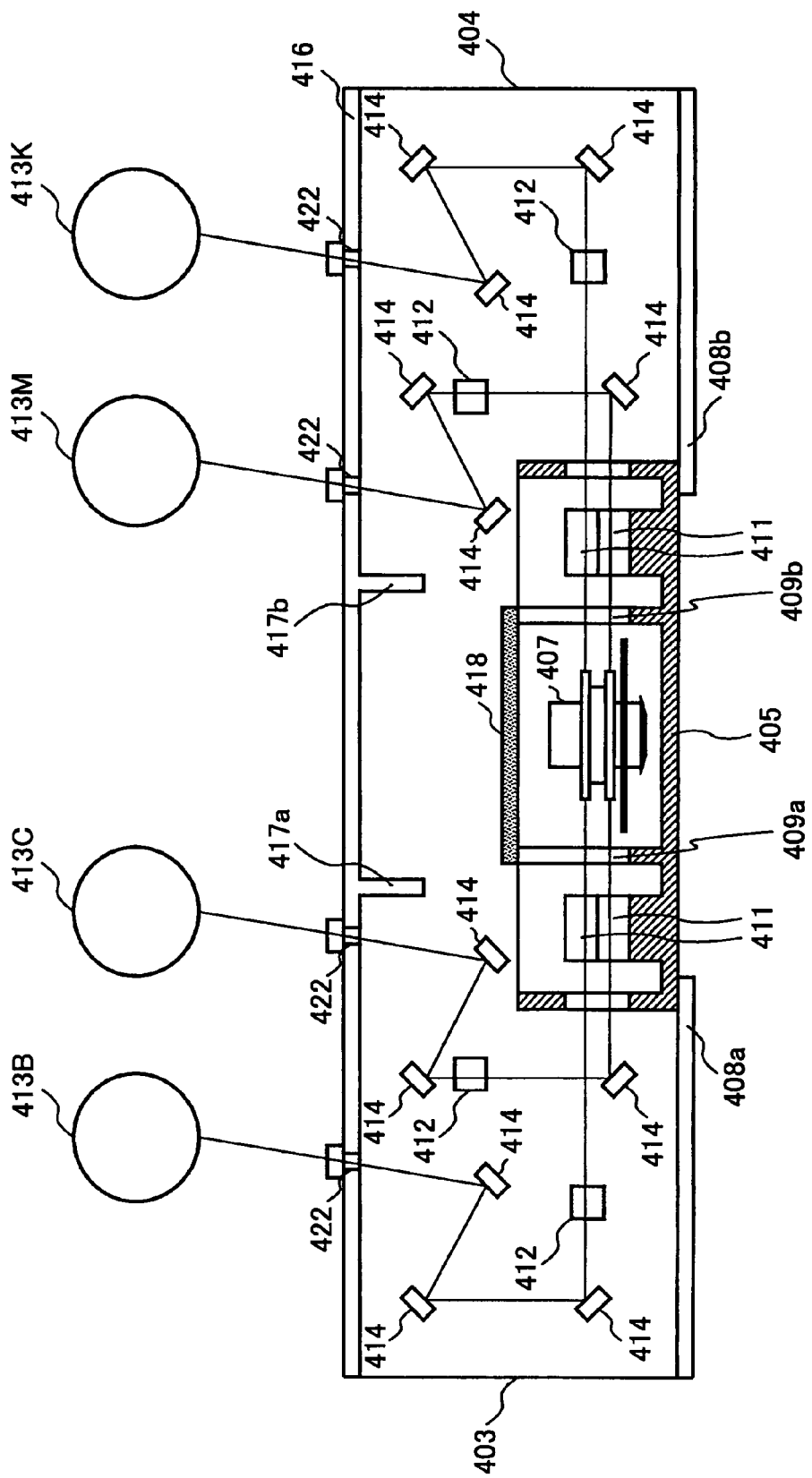
FIG. 3 is a cut-away side view in a sub scanning direction of the optical scanner according to the first embodiment of the present invention.
Figure 4:
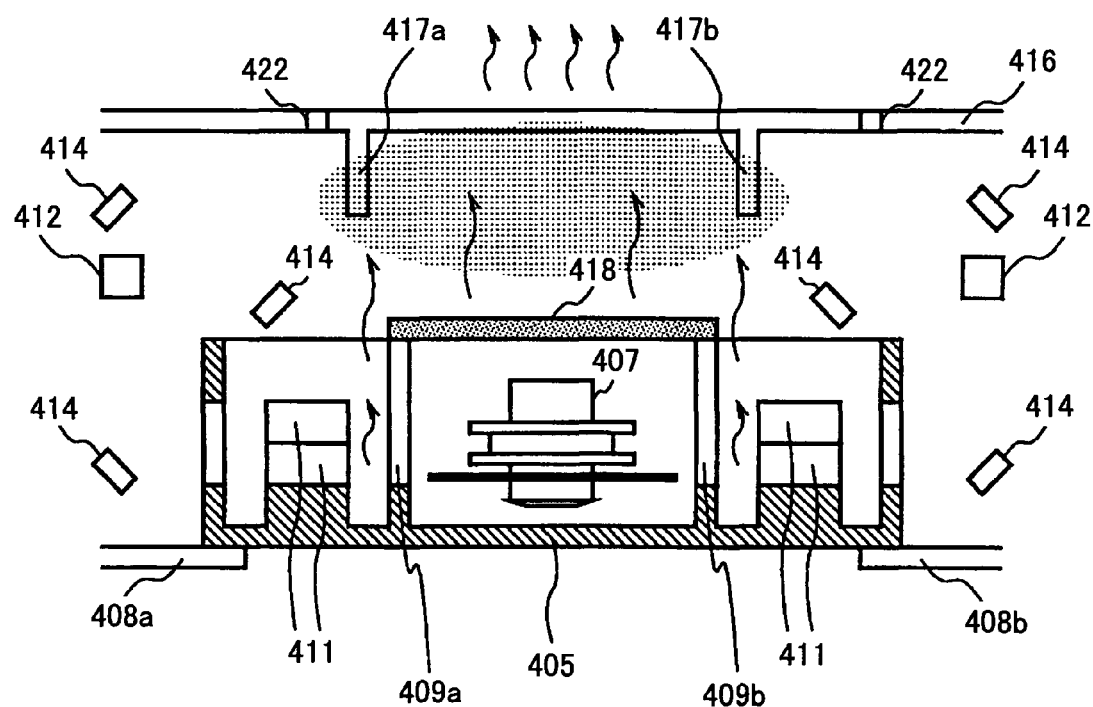
FIG. 4 is a detailed diagram illustrating the surroundings of a deflector of the optical scanner according to the first embodiment of the present invention.

An optical scanner according to a first embodiment of the present invention is described with reference to FIGS. 1-4. FIG. 1 is a perspective view of the optical scanner according to the first embodiment, FIG. 3 is a cut-away side view in a sub scanning direction, and FIG. 4 is a detailed diagram illustrating the surroundings of a deflector 407. Referring to FIG. 1, light fluxes irradiated from four light source units 406a-406d pass through a cylindrical lens 410 and reach a deflector 407. The light fluxes are deflected by the deflector 407, which is a rotating polygon mirror. The light fluxes are imaged and scanned on four photoconductors 413B, 413C, 413M, 413K by first scanning imaging elements 411 and second scanning imaging elements 412. FIG. 3 illustrates optical paths from the deflector 407 to the photoconductors 413B-413K on which the light fluxes are imaged. After being deflected by the deflector 407, each of the light fluxes passes through corresponding mirrors 414 (among a total of 3×4=12 mirrors) and a corresponding light irradiating window 422 (covered with dust-proof glass), and reaches a corresponding photoconductor (413B-413K). The rotating polygon mirror (deflector 407) and the first scanning imaging elements 411 are each configured with two levels, including an upper level arranged on a lower level.

As shown in FIG. 1, the 12 mirrors 414 are bridged across a front plate 401 and a rear plate 402 made of sheet metal, and supported therebetween. The mirrors 414 are pressed with springs into holes formed in the front plate 401 and the rear plate 402 so as to be fixed therebetween.

The front plate 401 and the rear plate 402 are connected to a left plate 403 and a right plate 404 to surround the side surface of the optical scanner. Furthermore, the top and the bottom of the optical scanner are covered by the bottom surface of an internal housing 405, two bottom covers 408a, 408b, and a top cover 416, so that the optical scanner is substantially sealed and separated from outside.

The internal housing 405 is made of resin. The light source units 406a-406d, the cylindrical lens 410, the deflector 407, and the first scanning imaging elements 411 are held inside the internal housing 405. The internal housing 405 is bridged across the front plate 401 and the rear plate 402 and held therebetween. The deflector 407 is surrounded by ribs and shield glasses 409a, 409b, which are formed integrally with the internal housing 405. Furthermore, a deflector cover 418 (see FIG. 2) made of sheet metal is screwed to the internal housing 405, so that the top of the deflector 407 is also covered. Accordingly, the deflector 407 is insulated (tightly sealed) from the other spaces within the optical scanner. This sealed space around the deflector 407 is hereinafter referred to as a "deflector room".

When the optical scanner is operating, i.e., when the deflector 407 is driven, the bearings and the driving IC of the deflector 407 generate heat. Therefore, the temperature of air inside the deflector room rises. As a result, the temperature of the shield glasses 409a, 409b and the deflector cover 418 serving as walls of the deflector room rises. Accordingly, the temperature of air outside the deflector room near the shield glasses 409a, 409b and the deflector cover 418 rises. As a result, as shown in FIG. 4, upward currents are generated due to natural convection along the shield glasses 409a, 409b and/or above the deflector cover 418. Ribs 417a, 417b are provided inside (beneath) the top cover 416 to form a U-shape (upside down) as shown in FIG. 4. Therefore, the warmed air stays between the ribs 417a, 417b, and does not diffuse. Accordingly, it is possible to reduce the amount heat traveling from the deflector 407 to optical elements such as the first scanning imaging elements 411 and the second scanning imaging elements 412, which elements in particular have a large impact on optical properties when affected by temperature changes. The U-shaped part formed by the ribs 417a, 417b can be made of a sheet-metal material in order to increase heat conductivity, so that the amount of heat reaching the deflector 407 can be reduced. The ribs 417a, 417b can be formed by bending inward (downward) two edges of the sheet-metal material. The ribs 417a, 417b forming part of the U-shaped part are extended in a direction substantially parallel to the main scanning direction. Therefore, the heat held between the ribs 417a, 417b of the top cover 416 is transferred outside through the top cover 416, so that even when the optical scanner operates for a long time, the temperature inside the optical scanner does not rise excessively.

Figure 5:
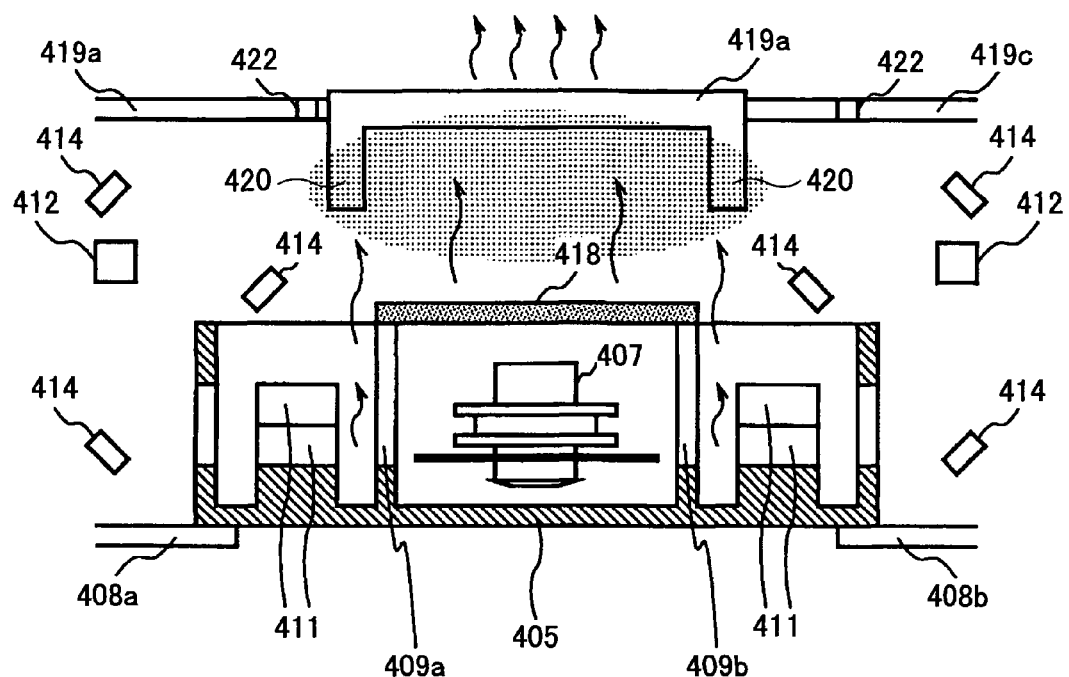
FIG. 5 is a detailed diagram illustrating the surroundings of a deflector of an optical scanner according to a second embodiment of the present invention.
Figure 6:
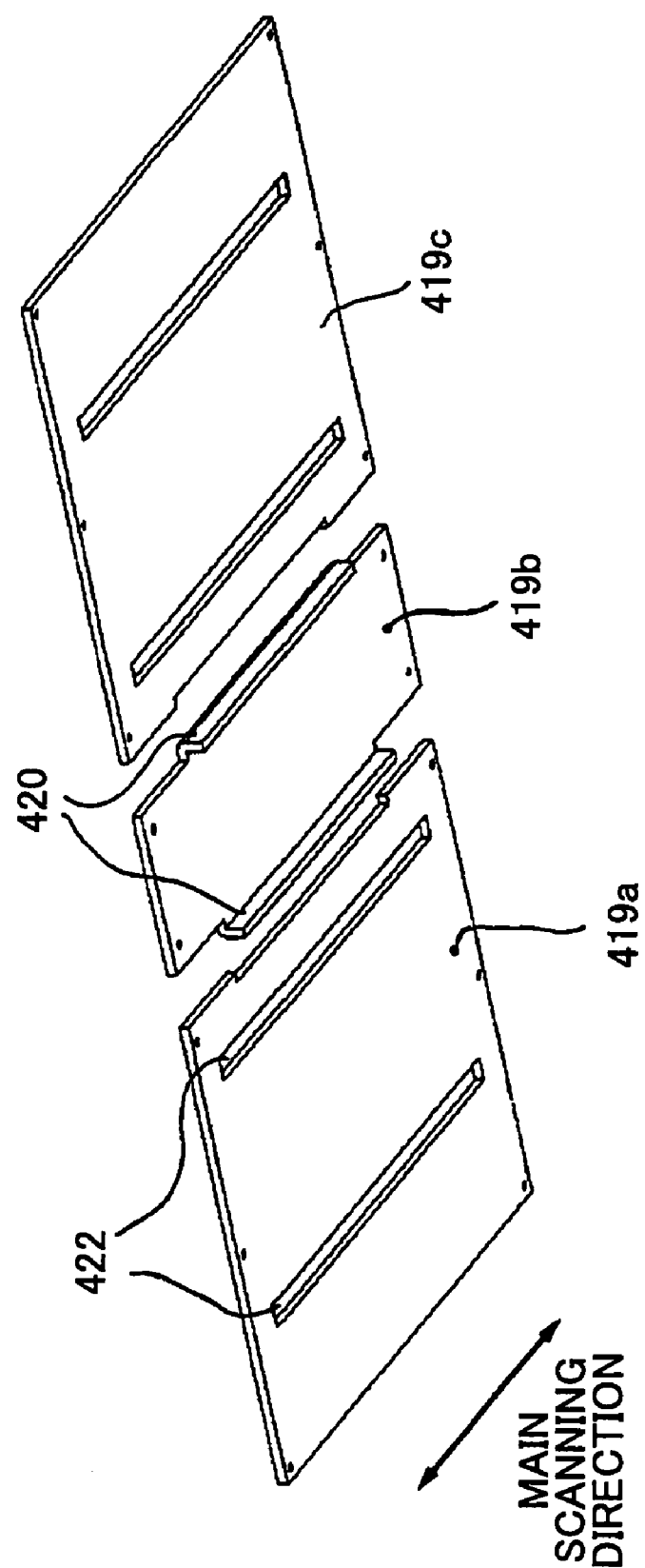
FIG. 6 is a top cover used in the optical scanner according to the second embodiment of the present invention.

An optical scanner according to a second embodiment of the present invention is described with reference to FIG. 5. The second embodiment has substantially the same configuration as the first embodiment, except that the top cover is made of three parts, namely a top cover resin part 419a, a top cover sheet metal part 419b, and a top cover resin part 419c. The top cover sheet metal part 419b has a higher level of heat conductivity than the top cover resin parts 419a, 419c. A counter scanning type optical scanner as shown in FIG. 1 requires a considerably large top cover, under which a single deflector 407 is used to scan light on four imaging surfaces. To fabricate such a large cover by resin molding, a large mold would be required, which increases the cost. However, if the cover is formed by separately fabricating plural portions as shown in FIG. 6, each mold can be reduced in size. Furthermore, by designing the layout so that the two top cover resin parts 419a, 419c on the left and right sides have the same shape, a single compact mold can be used for both of the top cover resin parts 419a, 419c. This reduces the cost significantly. Moreover, if each component is small, a container used for shipping the components can be filled with more components. As a result, it costs less to transport the fabricated cover portions to an assembly factory.

The top cover sheet metal part 419b arranged above the deflector 407 is made of sheet metal. By bending both edges of the top cover sheet metal part 419b to obtain bent portions 420, the same effects can be achieved as those of the ribs 417a, 417b of the top cover 416 of the first embodiment. Accordingly, the warmed air stays within the U-shaped part of the top cover sheet metal part 419b, so that heat is efficiently transferred outside the optical scanner. By providing slanted sections in the top cover sheet metal part 419b as shown in FIG. 7, a larger area of the top cover sheet metal part 419b contacts external air, and the volume of the U-shaped part increases, so that heat transfer efficiency is further enhanced.

The top cover sheet metal part 419b is bridged across the front plate 401 and the rear plate 402 and is screwed and fixed thereto. Because the front plate 401 and the rear plate 402 are long, the middle portions thereof may lack rigidity. However, by connecting these portions with a bridge, i.e., the top cover sheet metal part 419b, the rigidity can be reinforced. Furthermore, the bent portions 420 not only have a function of holding the warmed air, but also contribute significantly to reinforcing the rigidity of the front plate 401 and the rear plate 402. By making the front plate 401 and the rear plate 402 rigid, optical components, etc., held by these plates can be positioned highly precisely and resistance against vibration can also be enhanced. As a result, in this optical scanner, shapes and positions of beam spots imaged on the imaging surfaces are not deformed or displaced. Furthermore, by directly connecting the top cover sheet metal part 419b with the front plate 401 and the rear plate 402 that are also made of sheet metal, heat conductivity can be further promoted, and the front plate 401 and the rear plate 402 can also function as heat transferring materials in addition to the top cover sheet metal part 419b. Hence, the heat generated by the deflector 407 can be transferred highly efficiently.

By screwing the top cover sheet metal part 419b onto each of the front plate 401 and the rear plate 402 at least two positions each, the rigidity of the entire optical box is reinforced, so that distortion and deformation are prevented. Rigidity against distortion and deformation can be further reinforced if the top cover sheet metal part 419b has the widest possible width and the distance between screwed positions is long.

Figure 7:
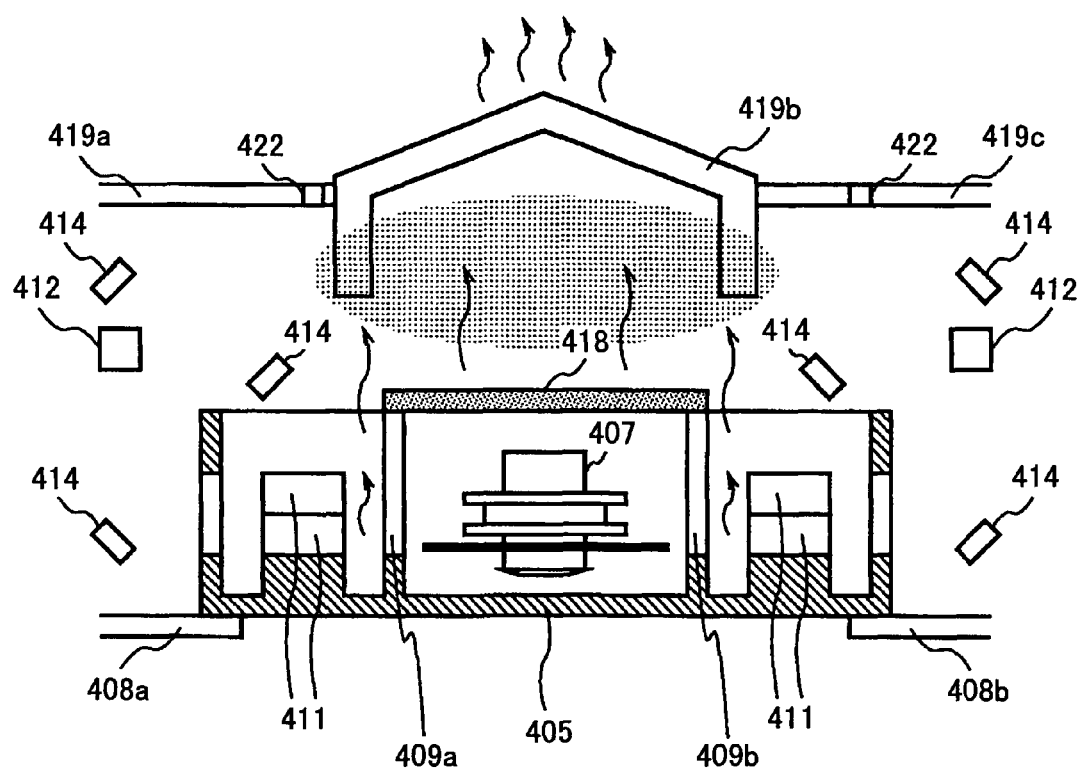
FIG. 7 is a detailed diagram illustrating the surroundings of the deflector of the optical scanner according to the second embodiment of the present invention, in which a top cover sheet metal part includes slanted sections.

If the U-shaped part of the top cover sheet metal part 419b in FIG. 7 has a cross-sectional shape that radially centers around the deflector 407 (a substantially cone-like shape), the air that is warmed near the deflector 407 can be held within such a shape (cone-like shape). Therefore, an increased amount of warm air can be held near the top cover sheet metal part 419b. Furthermore, the warm air is guided toward both the front plate 401 and the rear plate 402 made of sheet metal that has better heat transfer properties than resin, so that the warm air is transferred outside the optical scanner more efficiently. The mirrors 414 and the second scanning imaging elements 412 have shapes that principally extend in the main scanning direction. Therefore, by guiding the warm air in a direction parallel to the direction in which the optical elements are extended as in the present embodiment, the air current can be smoothly guided without being obstructed by the optical elements.

Figure 8:
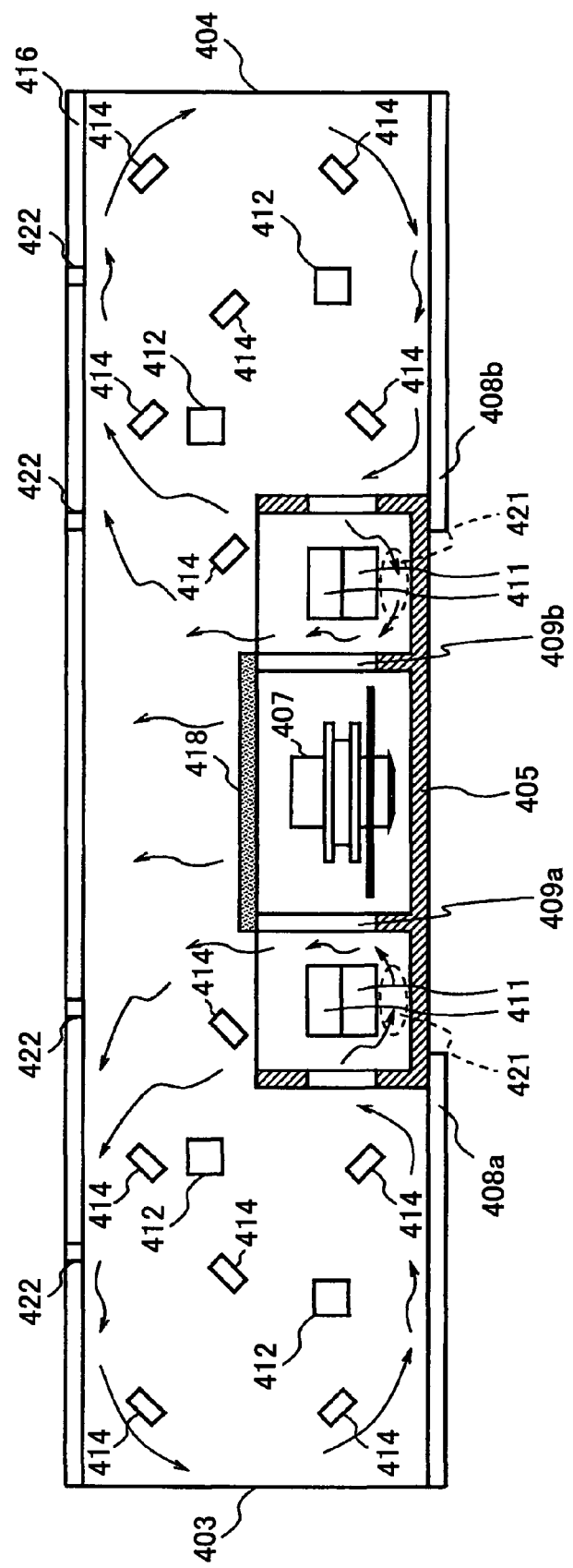
FIG. 8 is a detailed diagram illustrating the surroundings of a deflector of an optical scanner according to a third embodiment of the present invention.

An optical scanner according to a third embodiment is described with reference to FIG. 8. In the third embodiment, gaps 421 are provided between the first scanning imaging elements 411 and the bottom surface of the internal housing 405. Accordingly, a large flow is generated due to natural convection in the optical scanner, which flow rises near the deflector 407 and falls near both the left plate 403 and the right plate 404, as shown in FIG. 8. If there were no gaps between the first scanning imaging elements 411 and the bottom surface of the internal housing 405 as shown in FIG. 4 or 5, the warmed air would tend to flow upward, but there would be no passages to allow the air to flow downward so as to circulate. Hence, upward currents would not be generated as much as in the case of FIG. 8. In FIG. 8, the first scanning imaging elements 411 appear to be floating in midair, but both sides thereof are actually supported in the main scanning direction. The areas of the gaps 421 between the first scanning imaging elements 411 and the bottom surface of the internal housing 405 are preferably as large as possible.

Application of the present invention is not limited to an optical scanner surrounded by sheet metal side plates. The same effects can be achieved in an optical scanner employing an optical box that is resin molded as one piece, which is often used in the conventional technology.

According to one embodiment of the present invention, optical elements are not displaced or deformed due to heat generated from a deflector, and therefore, it is possible to realize at low cost an optical scanner in which optical properties are not degraded. Further, the deflector room is sealed so that hissing sounds caused by rotation of the deflector can be reduced outside the deflector room.

Any one of the optical scanners described in the above embodiments can be provided in a color image forming apparatus. Specifically, the optical scanner writes latent images onto the photoconductors 413B, 413C, 413M, 413K. Developing units corresponding to the photoconductors 413B, 413C, 413M, 413K apply toner of a corresponding color among black, cyan, magenta, and yellow to the latent images to produce toner images. The toner images of the respective colors are transferred and superposed onto a sheet of paper, and fixed thereon with a fixing unit, so that a full-color image is formed on the sheet of paper. The temperature around the deflector 407 can be decreased efficiently at low cost, and optical elements are not displaced or deformed due to heat generated from the deflector 407. As a result, a color image forming apparatus can be realized at low cost, in which optical properties are not degraded so that output images are not degraded. Further, a color image forming apparatus requiring less maintenance can be realized at low cost, because the deflector 407 does not generate excessive heat so that the deflector 407 and the optical scanner are less degraded and do not need to be frequently replaced. Further, a cooling fan, etc., does not need to be provided in order to reduce heat. As a result, a low-cost, energy-saving, and noise-free color image forming apparatus can be provided.

The present invention is not limited to the specifically disclosed embodiment, and variations and modifications may be made without departing from the scope of the present invention.

The present application is based on Japanese Priority Patent Application No. 2006-064153, filed on Mar. 9, 2006, the entire contents of which are hereby incorporated by reference.

What is claimed is:

1. An optical scanner comprising: a light source configured to emit a light beam;
   a deflector configured to deflect the light beam emitted by the light source;
   a scanning imaging element configured to image and scan the light beam deflected by the deflector as a light spot on an imaging surface; and an optical box configured to contain at least the deflector and the scanning imaging element, the optical box being substantially sealed from outside; wherein the deflector is substantially sealed so as to be substantially insulated from the scanning imaging element in the optical box, and among outer walls of the optical box insulating a space inside the optical box from the outside, at least an outer wall positioned above the deflector includes an upside-down U-shaped cross-sectional shape portion.

2. The optical scanner according to claim 1, wherein the upside-down U-shaped cross-sectional shape portion includes ribs facing downward provided along opposite edges thereof, and the ribs extend in a direction substantially parallel to a main scanning direction.

3. The optical scanner according to claim 1, wherein the upside-down U-shaped cross-sectional shape portion has a substantially cone-like shape centering around the deflector.

4. The optical scanner according to claim 1, wherein among the outer walls, at least the upside-down U-shaped cross-sectional shape portion is a sheet metal member.

5. The optical scanner according to claim 4, wherein the upside-down U-shaped cross-sectional shape portion is formed by bending downward two edges of the sheet metal member.

6. The optical scanner according to claim 1, wherein the outer wall positioned above the deflector is part of a cover covering an upper opening of the optical box, and the cover is formed by separately fabricating portions of the cover, wherein the portions include an undivided portion to be located above the deflector.

7. An image forming apparatus comprising:

the optical scanner according to claim 1, the optical scanner being configured to form a latent image on an image carrier; and a developing unit configured to develop the latent image and form an image.

* * * * *